(12) United States Patent
Mizukoshi et al.

(10) Patent No.: US 7,011,277 B2
(45) Date of Patent: Mar. 14, 2006

(54) ANTIVIBRATION CLAMP FOR ELONGATED OBJECTS

(75) Inventors: Suguru Mizukoshi, Ibaraki-ken (JP); Hiroyuki Kato, Ninomiya-Machi (JP); Hidehumi Okumoto, Karasuyana-Machi (JP); Kotaro Tanaka, Utsunomiya (JP); Motoyasu Sato, Utsunomiya (JP)

(73) Assignees: Newfrey LLC, Newark, DE (US); Honda Giken Kogyo K.K., Tokyo (JP)

( * ) Notice: Subject to any disclaimer, the term of this patent is extended or adjusted under 35 U.S.C. 154(b) by 0 days.

(21) Appl. No.: 10/810,828

(22) Filed: Mar. 29, 2004

(65) Prior Publication Data

US 2004/0251386 A1    Dec. 16, 2004

(30) Foreign Application Priority Data

Apr. 7, 2003   (JP) .............................. 2003-103147

(51) Int. Cl.
   *F16L 3/22*   (2006.01)
(52) U.S. Cl. ....................................... 248/68.1; 248/71
(58) Field of Classification Search ............... 248/71, 248/68.1, 73, 74.1, 74.2, 55
   See application file for complete search history.

(56) References Cited

U.S. PATENT DOCUMENTS

| | | | | |
|---|---|---|---|---|
| 2,355,742 A | * | 8/1944 | Morehouse | 248/68.1 |
| 2,404,531 A | * | 7/1946 | Archibald | 248/68.1 |
| 3,606,218 A | * | 9/1971 | Enlund et al. | 248/74.2 |
| 5,184,794 A | * | 2/1993 | Saito | 248/68.1 |
| 5,464,179 A | | 11/1995 | Ruckwardt | 248/68.1 |

(Continued)

FOREIGN PATENT DOCUMENTS

| | | | |
|---|---|---|---|
| EP | 1 036 966 | | 9/2000 |
| JP | 54-41954 | * | 4/1979 |
| JP | 4-44581 | | 4/1992 |
| JP | 4-75289 | | 6/1992 |
| JP | 7-247446 | * | 7/1995 |

(Continued)

OTHER PUBLICATIONS

Patent Abstracts of Japan, vol. 1997, No. 07, Jul. 31, 1997 & JP 9 079432 A, Mar. 25, 1997 (Abstract and Figs. 1, 4, 5, 7).

(Continued)

*Primary Examiner*—Ramon O Ramirez
(74) *Attorney, Agent, or Firm*—Miles & Stockbridge PC

(57) ABSTRACT

An antivibration clamp comprises a base made of hard resin and an object-holding portion of hard resin supported by the base. The object-holding portion includes a curved wall defining a recess for receiving an elongated object, and a resilient holding finger extending obliquely from the top of the curved wall or its vicinity toward the recess of the curved wall to press against the outer surface of an object received in the curved wall. The curved wall has an inner wall surface on which a plurality of elongated rigid ribs are formed to protrude inward and extend in the width direction of the curved wall with the ribs being spaced apart from each other in the circumferential direction of the curved wall. The inner wall surface and the ribs of the curved wall are coated with an antivibration material made of soft resin.

11 Claims, 9 Drawing Sheets

U.S. PATENT DOCUMENTS

| | | | | |
|---|---|---|---|---|
| 5,756,555 A | * | 5/1998 | Wesch et al. | 521/73 |
| 6,126,119 A | * | 10/2000 | Giangrasso | 248/58 |
| 6,152,412 A | * | 11/2000 | Basickes et al. | 248/317 |
| 6,588,533 B1 | * | 7/2003 | Larmande et al. | 180/291 |
| 2004/0188570 A1 | * | 9/2004 | Bauer | 248/68.1 |
| 2004/0217236 A1 | * | 11/2004 | Shibuya | 248/68.1 |

FOREIGN PATENT DOCUMENTS

| | | |
|---|---|---|
| JP | 9-79432 | 3/1997 |
| JP | 10-248145 | 9/1998 |
| JP | 2000-230674 | 8/2000 |
| WO | WO 02/079682 | 10/2002 |

OTHER PUBLICATIONS

Patent Abstracts of Japan, vol. 2000, No. 11, Jan. 3, 2001, & JP 2000 230674 A, Aug. 22, 2000 (Abstract and Figs. 1 & 4).

Patent Abstracts of Japan, vol. 1998, No. 14, Dec. 31, 1998 & JP 10 248145 A, Sep. 14, 1998 (Abstract and Fig. 1).

* cited by examiner

ANTIVIBRATION CLAMP FOR ELONGATED OBJECTS

CROSS-REFERENCE TO RELATED APPLICATION

This application claims the benefit of Japanese Application JP 2003-103147 filed Apr. 7, 2003, incorporated herein by reference.

BACKGROUND OF THE INVENTION

The present invention relates to a clamp for holding an elongated object or component, such as a pipe or a wire harness, in order to fix the object to a substrate or workpiece, such as an automobile body. In particular, the present invention relates to an antivibration clamp for an elongated object, designed to prevent vibration transmission to or from the object.

Japanese Utility Model Laid-Open No. 4-44581 (Publication 1) discloses a clamp for an elongated object, e.g., a pipe or the like, designed to prevent occurrence of fluttering noise caused by vibrations. This clamp comprises a base and an object-holding portion supported by the base. The object-holding portion includes a curved wall defining a recess for receiving an object therein, and a resilient holding finger extending obliquely from the top of the curved wall, or its vicinity, toward the recess of the curved wall to press against the outer surface of the object. The inner wall surface of the curved wall is coated with a soft buffering resin material. The soft buffering resin material absorbs fluttering noise of the object held in the curved wall.

Japanese Utility Model Laid-Open No. 4-75289 (Publication 2) discloses an antivibration clamp for an elongated object, e.g., a pipe or the like, designed to prevent vibration transmission to or from the object. This antivibration clamp includes an object holding portion composed of a pair of clamp members openably connected with one another by a thin hinge. Opposed surfaces of the clamp members are provided with an antivibration portion made of noise isolating/absorbing soft resin material to clamp an object between the opposed antivibration portions to avoid the object being pulled-out. The antivibration portions cover the outer surface of the object to obtain vibration-proof effect.

Japanese Patent Laid-Open No. 9-79432 (Publication 3) discloses an improvement of the clamp disclosed in Publication 1. Soft buffering resin material provided on the inner wall surface of the curved wall holds an object while preventing the object from being displaced in the axial direction. An aim of the improvement is to reduce the risk of a strong force applied in the axial direction of the object causing peeling of the soft buffering resin material. Specifically, the clamp of Publication 3 is directed to fixing the soft buffering resin material to the curved wall in such a manner that the soft buffering resin material extends along opposite side edges of the recess of the curved wall in a C-shape, to clasp the side edges so as to prevent the peeling.

Japanese Patent Laid-Open No. 10-248145 (Publication 4) discloses a cord clamp formed with a plurality of cord-holding portions and intended to facilitate an operation of inserting a cord therein, and to prevent a returning force of the cord-holding portions from deteriorating under a high temperature. This cord clamp is formed with a gap between the adjacent cord-holding portions to isolate them from one another, and a resilient member is inserted into the gap. The resiliency of the resilient member in the gap is utilized to prevent the returning force of the cord-holding portions from deteriorating in a high temperature environment, such as an engine compartment.

Japanese Patent Laid-Open No. 2000-230674 (Publication 5) discloses a pipe clamp comprising an automobile-body connection portion or base, a pipe binding portion or pipe-holding portion, separated from the base, and a coupling portion made of a soft material and embedded between the automobile-body connection portion and the pipe-binding portion through a two-color molding process. The soft coupling portion interposed between the automobile-body connection portion and the pipe-binding portion is utilized to absorb vibrations of the pipe held by the pipe-binding portion so as to prevent vibrations from being transmitted to the automobile-body connection portion.

While the clamp disclosed in Publication 1 (Japanese Utility Model Laid-Open No. 4-44581) has an antivibration function based on the soft buffering (antivibration) resin material covering an object held in the curved wall, a higher antivibration effect can be obtained only by increasing the thickness of the antivibration resin material. However, the antivibration resin material increased in thickness causes a problem of deterioration in the object holding force due to resulting increased softness or flexibility, which is likely to cause wobbling movements of the object in the curved wall. Further, as pointed out in Publication 3 (Japanese Patent Laid-Open No. 9-79432), the antivibration resin material tends to be peeled by a strong force applied in the axial direction of the object.

As to the clamp disclosed in Publication 2 (Japanese Utility Model Laid-Open No. 4-75289), a higher antivibration effect can be obtained only by increasing the thickness of the antivibration resin material, and the soft antivibration resin material increased in thickness is likely to cause wobbling movements of an object in the curved wall, similarly to the clamp in Publication 1. Further, because the object-holding portion is composed of the pair of clamp members openably connected with one another by the thin hinge, undesirable labor and time are required for swingably moving one of the clamp members about the hinge to open the object-holding portion, inserting an object into the holding portion, and then closing the clamp member.

While Publication 3 (Japanese Patent Laid-Open No. 9-79432) is intended to prevent peeling of the soft buffering resin material, it is difficult to obtain a sufficient antivibration effect. If the thickness of the soft buffering resin material is increased to obtain a sufficiently enhanced antivibration effect, the holding force will be likely to deteriorate, as with the clamp in Publication 1.

The cord clamp in Publication 4 is intended to prevent the returning force of the cord-holding portions from deteriorating under a high temperature. For this purpose, the resilient member is inserted into the gap between the adjacent cord-holding portions, and the resiliency of the resilient member is utilized to maintain the returning force of the cord-holding portion even if the body of the cord-holding portion has a returning force that deteriorates at a high temperature. This cord clamp is neither designed for the purpose of antivibration, nor has it a sufficient antivibration function. Further, the cord clamp in Publication 4 is devoid of a resilient holding finger extending obliquely from the top of the curved wall of the cord-holding portion toward the recess of the curved wall so as to press against the outer surface of the elongated object to prevent pullout of an object held in the cord-holding portion. Publication 4 does not include any suggestion of absorbing vibrations acting from an object to a resilient holding finger.

In the pipe clamp in Publication 5, a coupling portion made of a soft material is provided between the pipe-binding portion for holding a pipe and the automobile-body connection portion to be fixed to an automobile body. Thus, a fixing force between the pipe held by the pipe-binding portion and the automobile-body connection portion is likely to deteriorate.

BRIEF DESCRIPTION OF THE INVENTION

An object of the present invention is to provide an improved antivibration clamp for an elongated object such as a pipe or the like, capable of holding an object with a sufficient holding force while providing a high antivibration function.

Broadly, the present invention provides an antivibration clamp for holding an elongated object, such as a pipe, comprising a base made of hard resin, and an object-holding portion made of hard resin and supported by the base. The object-holding portion includes a curved wall connected integrally with the base to define a recess for receiving an elongated object therein, and a resilient holding finger extending obliquely from the top of the curved wall or its vicinity toward the recess of the curved wall to press against the outer surface of the object. The curved wall has an inner wall surface formed with a plurality of elongated rigid ribs protruding inward and extending in the width direction of the curved wall while being spaced apart from each other in the circumferential direction of the curved wall, and the inner wall surface and the ribs of the curved wall are covered with an antivibration material made of soft resin.

The antivibration material interposed between the recess of the curved wall and a pipe or the like can provide a high antivibration function to eliminate abnormal noises caused by vibrations of the pipe or the like. The tops of the ribs are in contact with the pipe or the like through the antivibration material, and the rigidity of the ribs allows the pipe or the like to be held with a sufficient holding force. Furthermore, even if a strong force applied in the width direction of the curved wall (i.e., in the axial direction of the pipe or the like), acts on the antivibration material as a peeling force, the antivibration material made of soft resin and covering the elongated ribs protruding from the inner wall surface of the curved wall can be firmly fixed on the inner wall surface of the curved wall to resist against the peeling force.

In one embodiment of the above antivibration clamp, each of the ribs includes a top portion having a length equal to the width of the curved wall, and a root portion on the inner wall surface. Each of opposite longitudinal ends of each rib is tapered in such a manner that the length of the root portion becomes shorter than the width of the curved wall. This allows the antivibration material to be coated thicker, or with higher peeling resistance, at the respective root portions at opposite ends of each of the ribs, so that the risk of peeling is further reduced.

All of the curved wall, the resilient holding finger, the ribs and the base may be integrally formed as a primary molded product of hard resin, and the antivibration material may be coated on the curved wall and the ribs of the primary product to form a final molded product. The antivibration material may be applied in a two-color molding process or an insert molding process, for example. Thus, the time for assembly and the number of parts can be reduced. The antivibration material may be coated on opposite side surfaces of the curved wall including opposite ends of each of the ribs.

In one embodiment of the above antivibration clamp, the base includes a plurality of object-holding portions integrally formed therewith, and at least one of the object-holding portions is formed as an antivibration-material-coated object-holding portion coated with the antivibration material. A space may be formed between the curved walls of an antivibration-material-coated object-holding portion and an object-holding portion adjacent to the antivibration-material-coated object-holding portion, to isolate the curved walls from one another, and the space may be filled with the antivibration material during the coating process for forming the antivibration-material-coated object-holding portion. This can prevent vibration transmission between the adjacent object-holding portions to provide enhanced antivibration effect. Further, if a pipe or the like vibrated in a pullout direction acts to bend the resilient holding finger, the antivibration material, or soft material, in the space will allow the resilient holding finger, which presses against the outer surface of the elongated object, to be deformed or bent toward the space while flexibly following the movement of the object, so as to absorb the vibration of the object, and properly maintain the holding function of the resilient holding finger even if the object is roughly vibrated. In addition, the object can be inserted into the object-holding portion by a relatively low force to facilitate the insertion operation.

At least one of the outer surfaces of adjacent curved walls opposed to one another across a space may be formed with a protrusion in engagement with the antivibration material in the space. The protrusion allows the antivibration material to be more firmly fixed to an object-holding portion made of a hard resin, so as to prevent peeling of the antivibration material from the object-holding portion. Additionally, an antivibration clamp may include a through-hole extending in the width direction of a curved wall (i.e., in the longitudinal direction of an object held in the object-holding portion) between the base and the bottom of the curved wall of the antivibration-material-coated object-holding portion, and the antivibration material may be inserted in the through-hole. This allows the bottom of the object-holding portion to be readily deformed so as to provide an enhanced vibration absorbing effect.

BRIEF DESCRIPTION OF THE DRAWINGS

The invention will be further described in conjunction with the accompanying drawings, which illustrate preferred (best mode) embodiments, and wherein.

DETAILED DESCRIPTION OF THE INVENTION

Figure 4:
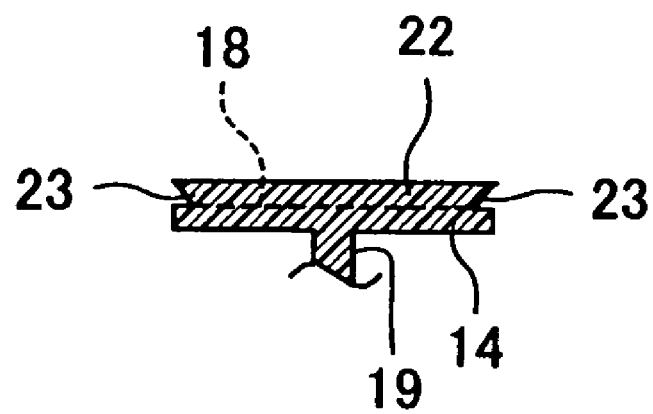
FIG. 4 is a sectional view taken along the line 4—4 of the clamp in FIG. 2.
Figure 5:
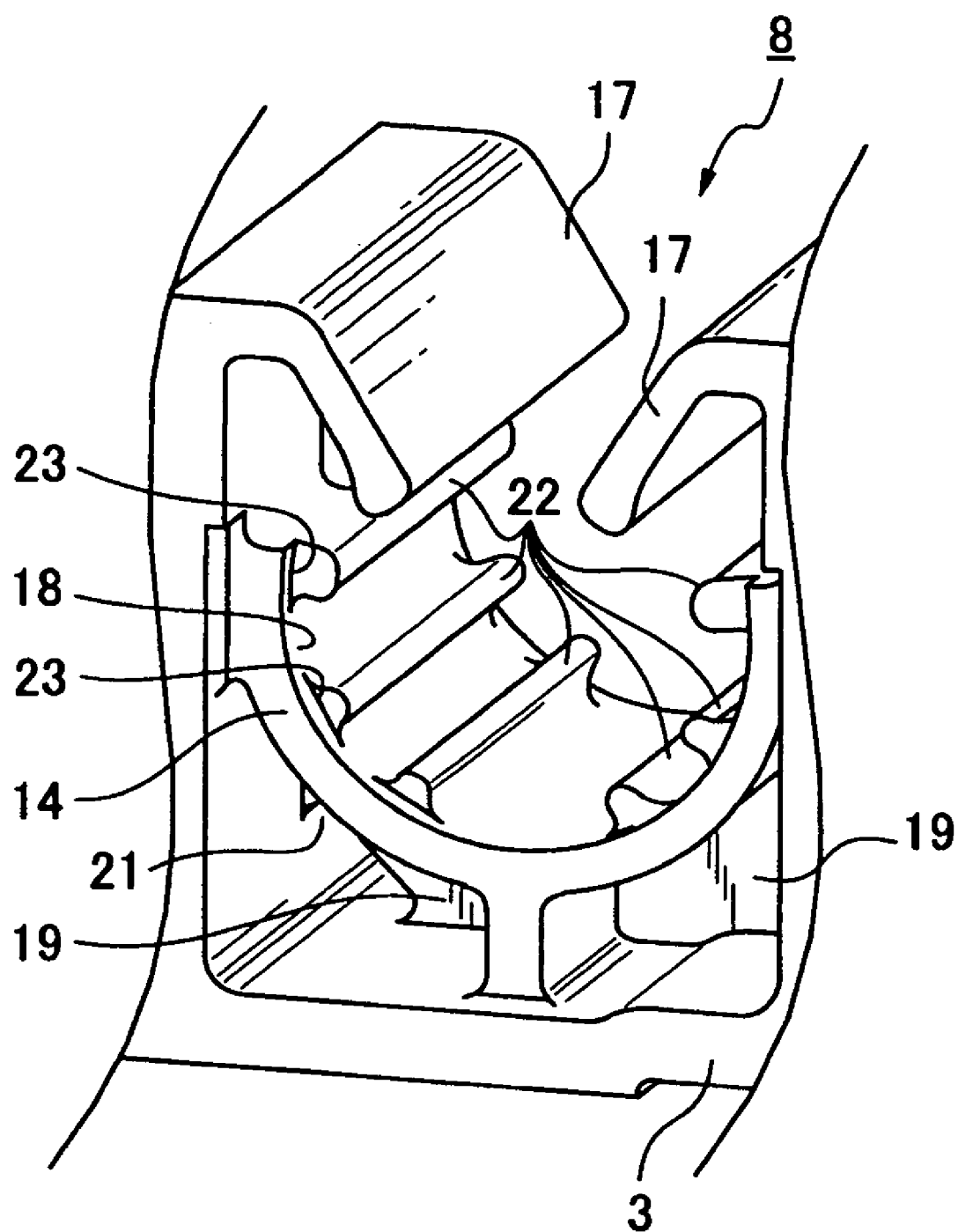
FIG. 5 is a perspective view of an object-holding portion 8 of the clamp in FIG. 1.
Figure 6:
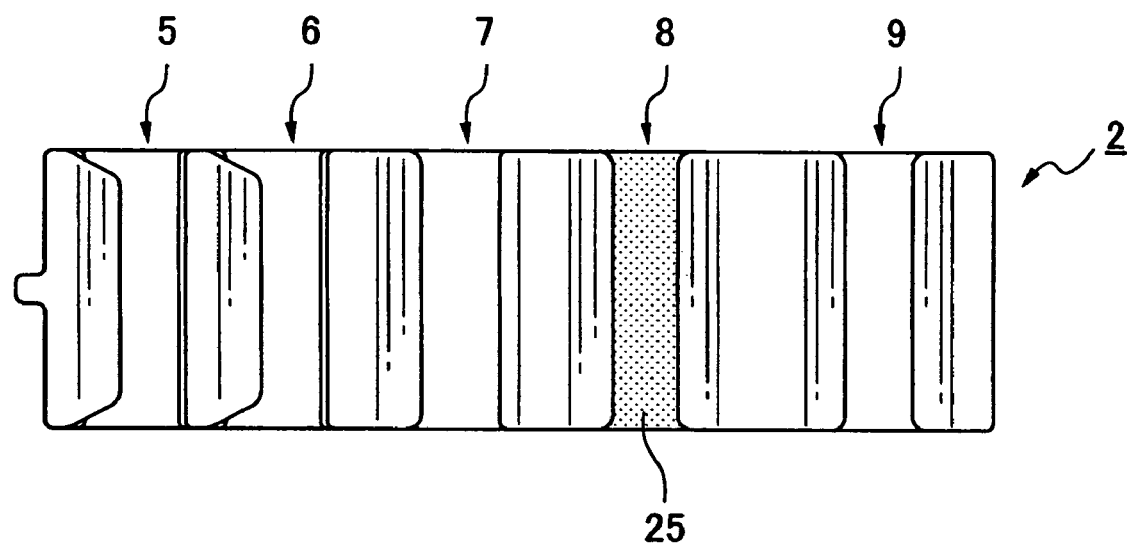
FIG. 6 is a top plan view of an antivibration clamp according to the first embodiment under the condition after an antivibration material has been coated on the clamp in FIG. 1.
Figure 7:
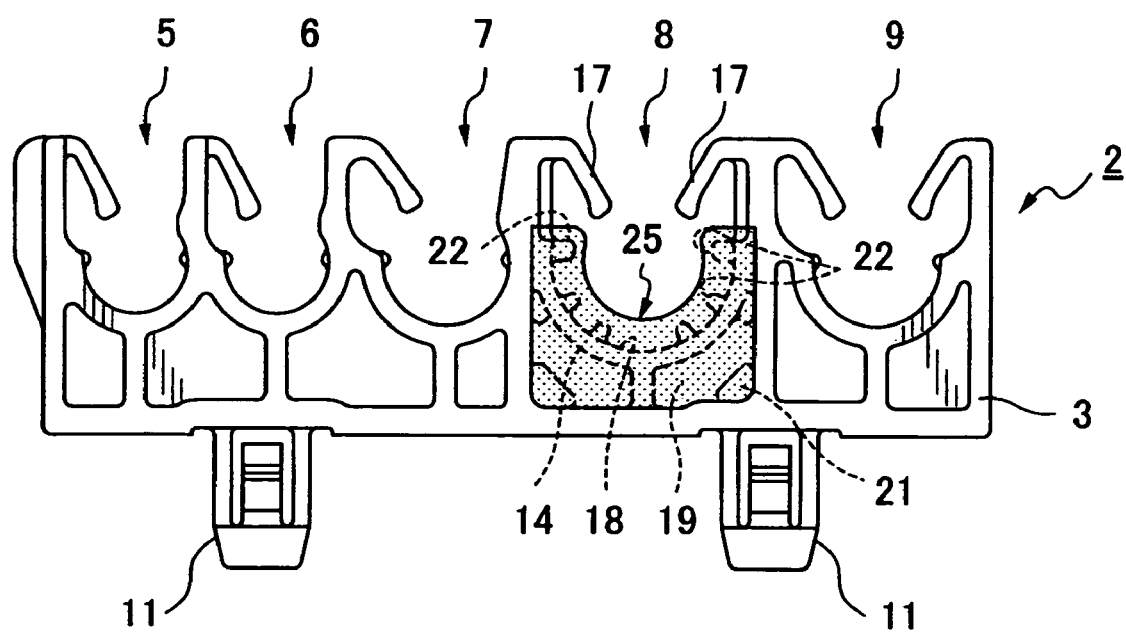
FIG. 7 is a front view of the antivibration clamp in FIG. 6.
Figure 8:
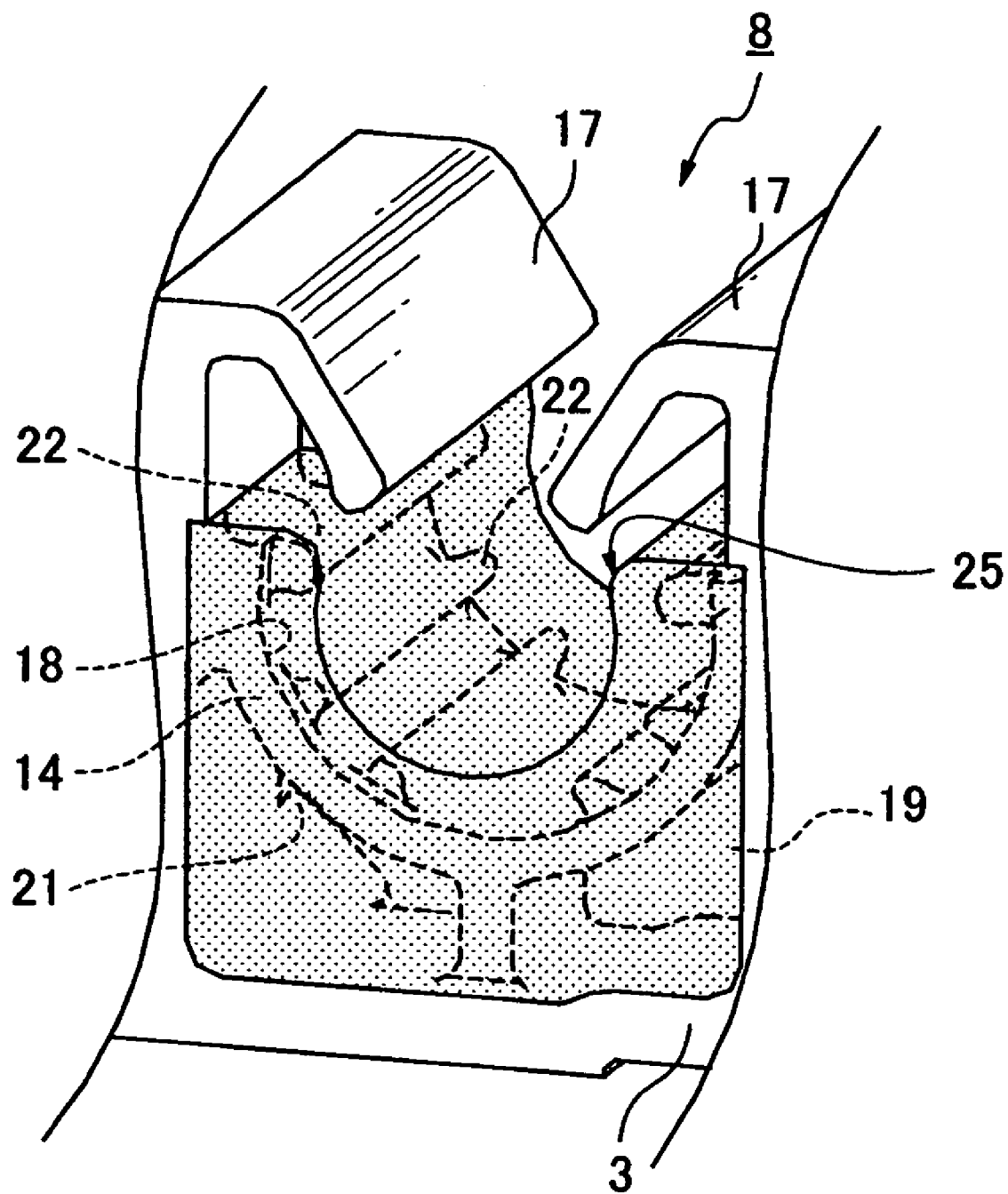
FIG. 8 is a perspective view of the object-holding portion 8 of the antivibration clamp in FIG. 6.

With reference to the drawings, an antivibration clamp for various elongated objects, such as a fuel pipe, a brake oil pipe, or a wire harness, according to an embodiment of the present invention is shown in FIGS. 1–8. FIGS. 1 to 5 show a clamp 1 formed as a primary molded product, which has not been coated with a antivibration material. FIGS. 6 to 8 show an antivibration clamp 2, according to a first embodiment of the present invention, which is a secondary (final) molded product prepared by coating an antivibration material on the clamp 1 or the primary molded product in FIGS. 1 to 5. With reference to FIGS. 1 to 5, the primary molded product 1 will first be described.

Figure 1:
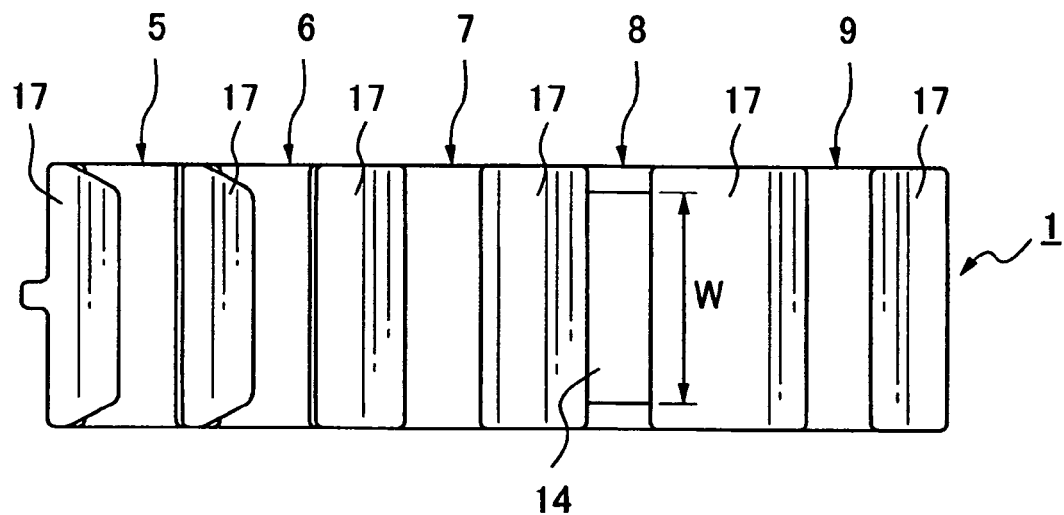
FIG. 1 is a top plan view of a clamp according to a first embodiment of the present invention, under the condition before an antivibration material is coated thereon.
Figure 2:
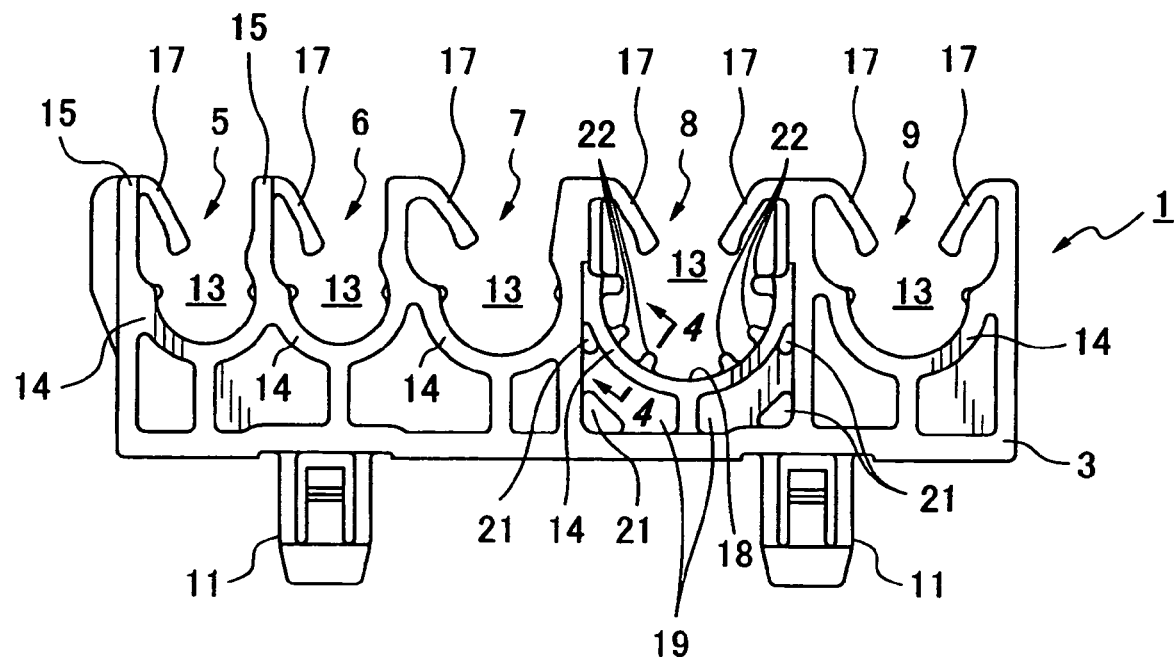
FIG. 2 is a front view of the clamp in FIG. 1.
Figure 3:
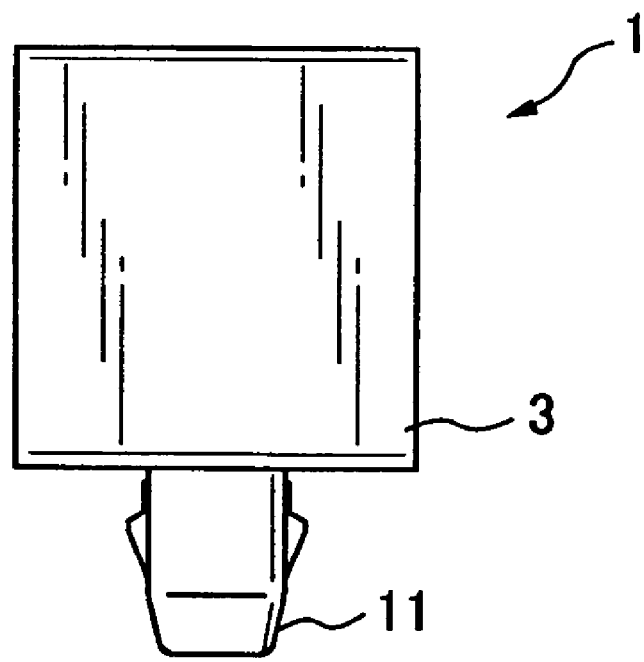
FIG. 3 is a right side view of the clamp in FIG. 1.

In FIGS. 1 to 3, the primary molded product comprises a base 3, and a plurality of object-holding portions 5 to 10 supported by the base 3. The base 3 is formed with two anchor-leg clips 11 serving as devices to fix a clamp of the invention to a substrate or workpiece, such as an automobile body. The base 3, the object-holding portions 5 to 9 and the anchor-leg clips 11 are preferably integrally molded of hard resin to have high rigidity. The fixing device is not limited to an anchor-leg clip, but any other suitable type may be used. If the workpiece has a stud bolt standing thereon, the fixing device may be a stud engagement fastener. The object-holding portions 5 to 9 may be formed to have various sizes and shapes to hold various types of objects. The number and size of each of the object-holding portions may be freely selected depending on objects to be held.

Each of the object-holding portions 5 to 9 includes a curved wall 14 defining a recess 13 for receiving therein an elongated object, such as a pipe, and a resilient holding finger 17 extending obliquely from the top (upper end in FIG. 2) of the curved wall 14, or its vicinity, toward the recess 13 of the curved wall 14 to press against the outer surface of the elongated object, when received in the curved wall. While each of the object-holding portions 8 and 9 includes two of the resilient holding fingers 17 suitable for holding a large-diameter object, only one resilient holding finger 17 may be used if an adequate holding force can be obtained. Each of the object-holding portions 5 to 9, except for the object-holding portion 8, has a conventional structure including the curved wall 14 and the resilient holding finger 17. In this conventional object-holding portion, when a pipe or the like is pushed into the recess 13 of the curved wall 14 from the side of the resilient holding finger 17, the end of the resilient holding finger 17 presses against the outer surface of the pipe or the like onto the inner wall surface 18 of the curved wall 14 to hold the pipe or the like. The object-holding portion 8 is designed for the present invention.

The object-holding portion 8 according to an embodiment of the present invention has a different shape from that of the conventional object-holding portions. FIG. 5 is a perspective view showing the object-holding portion 8 in detail. As illustrated in FIGS. 1 to 5, in order to obtain a space for allowing opposite side surfaces of the object-holding portion to be coated with an antivibration material, the curved wall 14 of the object-holding portion 8 is preferably formed to be shorter than other curved walls, having the width W in the width direction (i.e., the length or longitudinal direction of an object to be held in the object-holding portion of FIG. 1).

The curved wall 14 is supported by a plate-shaped support portion 19 standing upright from the base 3, in a manner similar to that in other object-holding portions, but the support portion 19 is different in that each of four corners is preferably formed with a hole 21 which allows a portion of antivibration material to flow thereinto in a process of molding and coating the antivibration material, so as to provide an increased fixing strength of the antivibration material to the object-holding portion.

The inner wall surface 18 of the curved wall 14 is formed with a plurality (six in the illustrated embodiment) of elongated rigid ribs 22 protruding inward and extending in the width direction of the inner wall surface 18 while being spaced apart from each other in the circumferential direction of the curved wall 8. The ribs 22 are integrally formed with the inner wall surface 18. Thus, each of the ribs 22 has the same rigidity as that of the object-holding portion 8. The number of the ribs 22 and the respective positions of the ribs 22 on the inner wall surface 18 may be freely selected as long as an object received in the curved wall 14 is stably seated thereon.

As illustrated, in the embodiment the curved wall 14 is formed to have a half-circular cylindrical shape, and is formed with three pairs of ribs in such a manner that the pairs are arranged in parallel from the upper end toward the bottom surface of the curved wall 14 in opposed relation to one another, and no rib is arranged on the bottom surface. As a result, an object-holding portion 8, after an antivibration material is coated thereon, can stably support a pipe, for example, with reduced vibration transmission from the pipe to the base (or the base to the pipe).

The height of each of the ribs 22 is selectively determined such that an object, such as a pipe, can be stably seated thereon while preventing the size of the object-holding portion 8 from increasing excessively. Each of the ribs 22 includes a top portion having a length equal to the width W in FIG. 1 of the curved wall 14, and a root portion 23 on the inner wall surface 18 of the curved wall 14. In the embodiment, each of opposite ends of each rib 22 is tapered in such a manner that the length of the root portion 23 becomes shorter than the width of the curved wall. This shape of each rib 22 is shown in FIG. 4, which is a sectional view taken along the line 4—4 in FIG. 2.

The clamp 1 having the object-holding portion 8 formed with the ribs 22 is preferably formed as a primary molded product. The object-holding portion 8 of the clamp 1 formed as a primary molded product can then be coated with an antivibration material to obtain an antivibration clamp 2 according to the present invention. The antivibration material 25 is selected from a certain soft material having a function of preventing an object held in the object-holding portion from being displaced in the axial direction. For example, one typical material is thermoplastic elastomer (TPE).

As shown in FIGS. 6 to 8, the ribs 22 and the inner wall surface 18 of the curved wall 14 of the object-holding portion are coated with the antivibration material 25 made of soft resin. This antivibration material can be coated by either a two-color molding process or an insert molding process, for example, to reduce the assembly time and/or the number of the components. For example, a coating process can be performed using a mold surrounding the inner wall surface 18 of the curved wall 14 in the object-holding portion 8 of the clamp 1 formed as a primary molded product. A certain soft resin suitable for antivibration is melted, and then the melted soft resin is solidified in the mold. The antivibration material 25 is coated on the entire curved wall including all of the ribs 22. The antivibration material 25 made of soft resin is firmly fixed on the curved wall portion 14 in the state where it covers the ribs 22 and enters into the tapered portions at the root portions 23 on opposite sides in FIG. 4. In addition, a portion of the antivibration material 25 entering the holes 21 of the support portion 19 is also fixed to the curved wall 14 to provide a strong fixing strength.

The antivibration clamp according to the present invention includes at least one antivibration-material-coated object-holding portion. Although a single antivibration material coated object-holding portion is provided in the antivibration clamp of this embodiment, a plurality may be provided.

When a pipe, for example, is inserted into the object-holding portion 8 coated with the antivibration material 25, the resilient holding finger 17 is bent. Then, after the pipe is received in the recess of the curved wall portion 14, the resilient holding finger 17 returns to its original position to press the outer surface of the pipe onto the inner surface 18 of the curved wall 14. The outer surface of the pipe is brought into contact with the antivibration material 25 to allow a high antivibration function to be achieved. Further, the respective top portions of the ribs are brought into contact with the pipe through the antivibration material to hold the pipe with sufficient holding force in accordance with the rigidity of the ribs 22. The antivibration material 25 has the function of preventing the pipe held in the object-holding portion from being displaced in the axial direction of the pipe. Since the antivibration material 25 is coated on the elongated ribs 22 protruding from the inner wall surface of the curved wall 14, even if a strong force applied in the axial direction of the pipe, i.e., in the width direction of the curved wall, acts on the antivibration material as a peeling force, the antivibration material 25 firmly fixed to the inner wall surface 18 of the curved wall can resist peeling. A portion of the antivibration material entering into the holes 21 of the support portion 19 is strongly fixed to the curved wall 14 to reliably prevent peeling of the antivibration material.

FIGS. 9 to 15 show an antivibration clamp 27 according to a second embodiment of the present invention. The structure of the antivibration clamp 27 according to the second embodiment is different from that of the antivibration clamp 2 according to the first embodiment, in the following three points particularly:

First, a space 31 is formed between a curved wall 30 of an antivibration-material-coated object-holding portion 29 and a curved wall 14 of an object-holding portion 7 (and an object-holding portion 9) adjacent to the antivibration-material-coated object-holding portion 29, to isolate the curved walls from one another, and an antivibration material 25A fills in the space 31.

Second, each of the outer surfaces of the adjacent curved walls 30 and 14 opposed to one another across the space 31 is formed with a protrusion 33, 34 in engagement with the antivibration material in the space 31.

Third, a through-hole 37 is formed between a base 3 and the bottom 35 of a recess 13 of the curved wall 30 of the antivibration-material-coated object-holding portion 29 and extends in the width direction of the curved wall 30 (i.e., in the longitudinal direction of a pipe or the like). The antivibration material 25A fills the through-hole 37.

Figure 13:
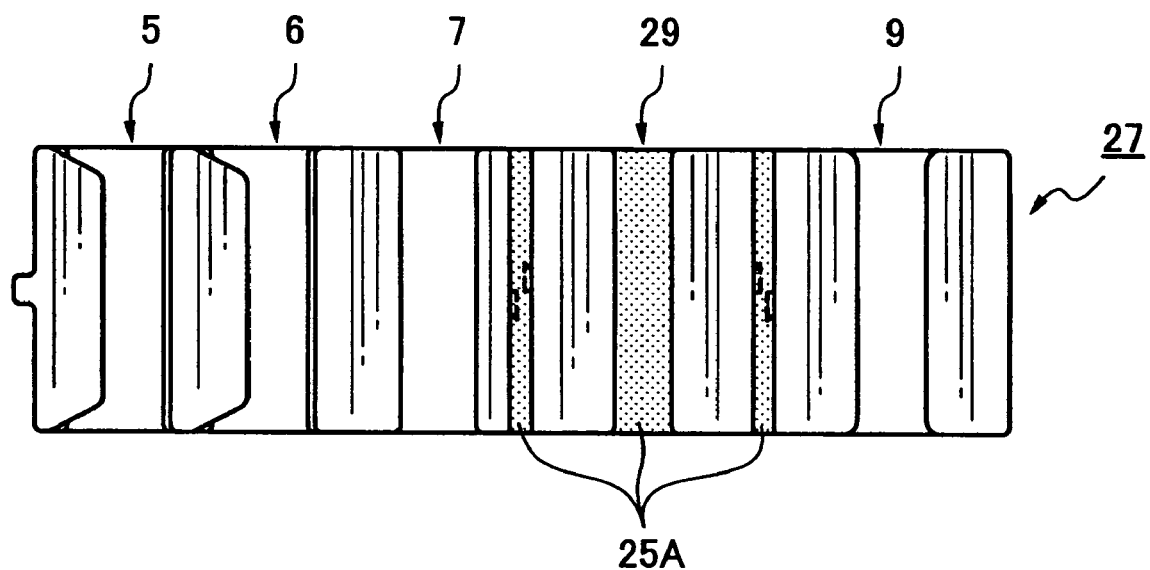
FIG. 13 is a top plan view of an antivibration clamp according to the second embodiment of the present invention under the condition after an antivibration material has been coated on the clamp in FIG. 9.
Figure 14:
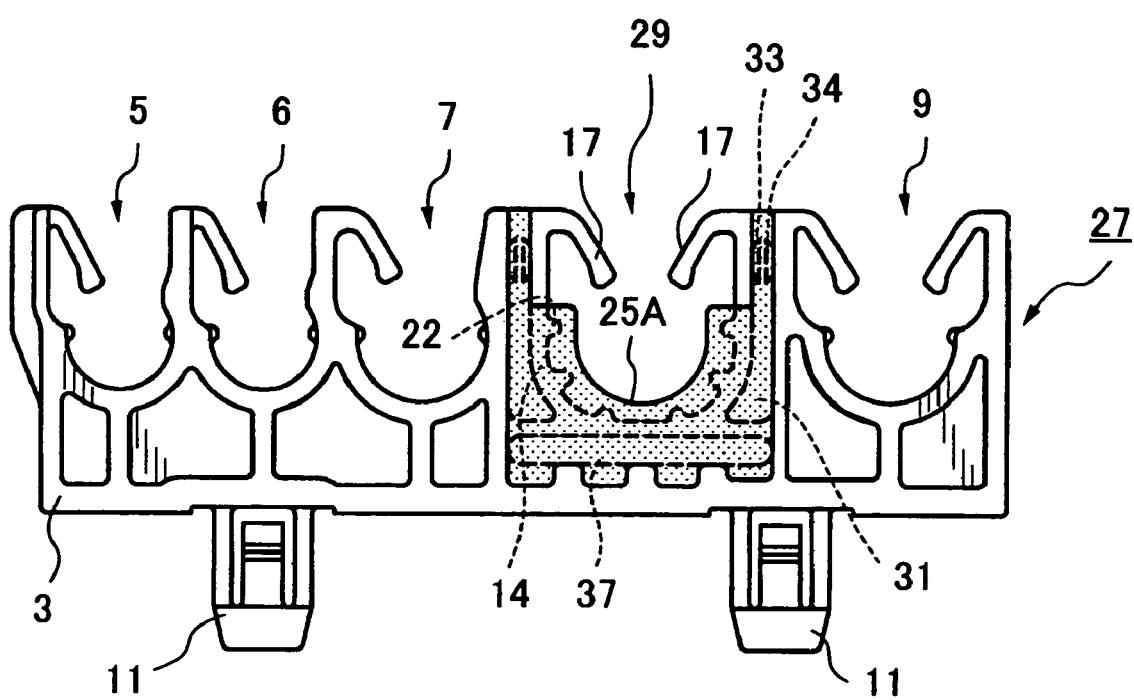
FIG. 14 is a front view of the antivibration clamp in FIG. 13.
Figure 15:
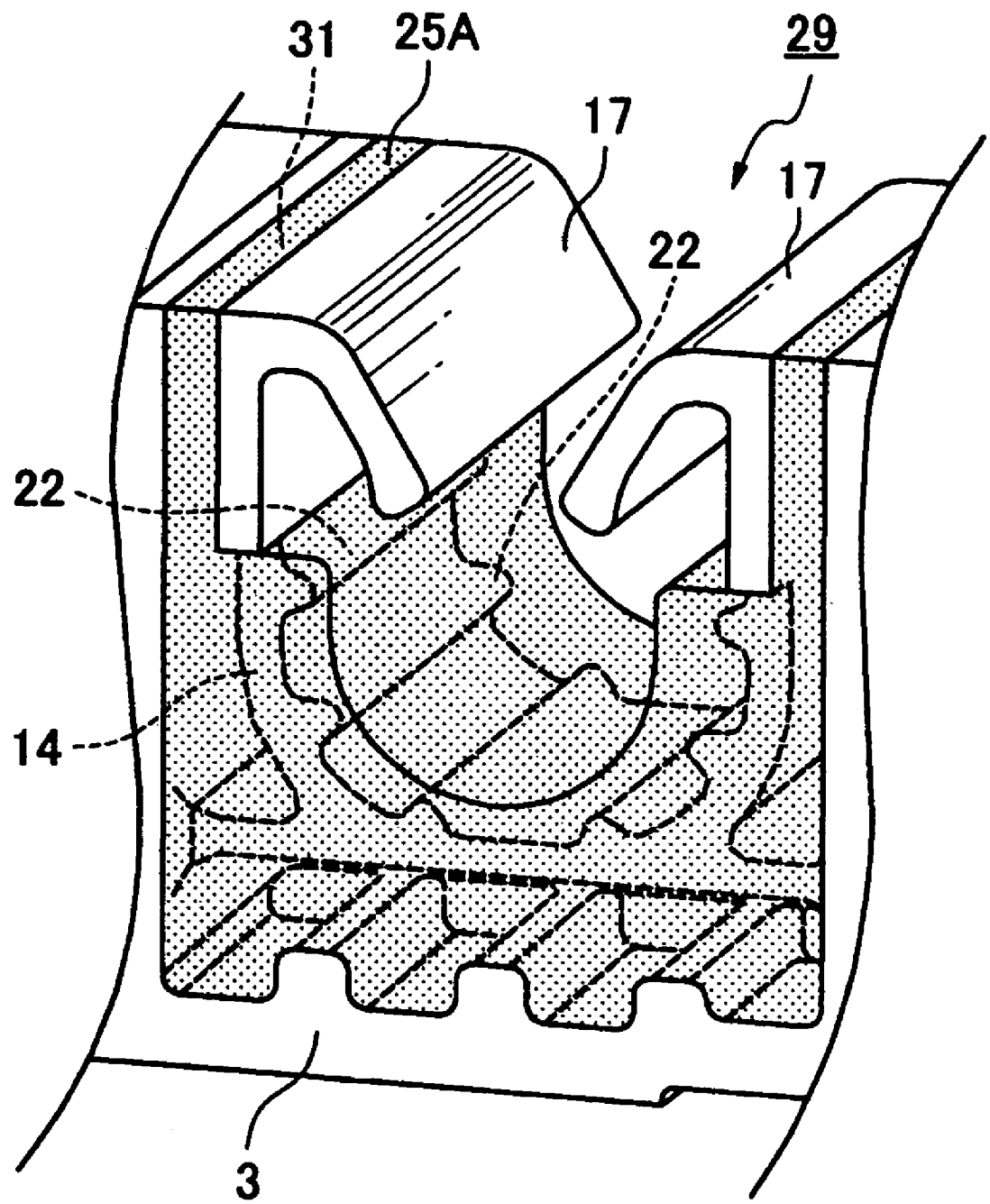
FIG. 15 is a perspective view of the object-holding portion 8 of the antivibration clamp in FIG. 13.

Other aspects of the second embodiment are similar to those of the first embodiment. As illustrated in FIGS. 13 to 15, the antivibration clamp 27 according to the second embodiment comprises a base 3 made of hard resin, a plurality of object-holding portions 5, 6, 7, and 9 made of hard resin and supported by the base 3, and at least one antivibration-material-coated object-holding portion 29 coated with the antivibration material 25A. As with the antivibration clamp 2 according to the first embodiment, these object-holding portions 5, 6, 7, 9, 29 are integrally connected to the base 3.

More particularly, the antivibration clamp 27 according to the second embodiment is similar to the antivibration clamp 2 according to the first embodiment in the following three points:

First, as shown in FIGS. 9 to 12, the object-holding portions 5, 6, 7, 9, 29 and the base 3 are integrally formed as a primary molded product 38 using hard resin, and all of a curved wall 30, a resilient holding finger 17 and ribs 22 in the object-holding portion 29 and the base 3 are integrally formed as the primary molded product 38 of hard resin.

Second, as shown in FIGS. 13 to 15, in the object-holding portion 29 of the primary molded product 38, the curved wall 30 and the ribs 22 are coated with the antivibration material 25A to form the antivibration clamp 27 as a secondary (final) molded product.

Third, the antivibration material 25A is coated by either the two-color molding process or the insert molding process, for example.

As with the object-holding portion 9, the object-holding portion 29 includes a curved wall 14 defining a recess 13 for receiving therein an elongated object, such as a pipe, a resilient holding finger 17 extending obliquely from the top of the curved wall 14 or its vicinity toward the recess 13 of the curved wall to press against the outer surface of a pipe or the like, when received in the curved wall, and a plurality of elongated rigid ribs 22 protruding inward from the inner wall surface of the curved wall 14 and extending in the width direction of the curved wall portion 14 while being spaced apart from each other in the circumferential direction of the inner wall surface. Each of the ribs 22 of the antivibration clamp 27 according to the second embodiment preferably includes a top portion (not shown) having a length equal to the width of the curved wall 14, and a root portion on the inner wall surface of the curved wall portion 14. Each of opposite ends of the rib 22 is tapered in such a manner that the length of the root portion becomes shorter than the width of the curved wall. This shape of the rib 22 is shown in FIG. 4, which is a sectional view taken along the line 4—4 in FIG. 2. Further, as with the antivibration clamp 2 according to the first embodiment, the base 3 of the antivibration clamp 27 is formed with two anchor-leg clips 11 serving as fixing devices adapted to be fixed to a substrate, such as an automobile body.

The aforementioned differences from the antivibration clamp 2 according to the first embodiment will be described below in detail.

A space 31 is formed between the curved wall 30 of the antivibration-material-coated object-holding portion 29 and the curved wall 14 of the object-holding portion 7 adjacent to the curved wall 30, to isolate the curved walls from one another. Another space 31 is formed between the curved wall 30 of the antivibration-material-coated object-holding portion 29 and the curved wall 14 of the object-holding portion 9 adjacent to the curved wall 30, to isolate the curved walls from one another, and an antivibration material 25A fills the spaces 31 (see FIGS. 9 to 15). As illustrated in FIG. 15, the antivibration material 25A made of soft resin, such as TPE, fills the spaces 31 in the secondary molding process. The antivibration material 25A filling in the spaces 31 can prevent vibrations of a pipe or the like held in the object-holding portion 29 from transmitting to the curved walls 14 of adjacent object-holding portions 7 and 9, to provide further enhanced antivibration effect.

In some cases, a pipe or the like held in the object-holding portion 29 is likely to be vibrated in the pullout direction to deform or bend the resilient finger 17. Even in such a case, the soft-material-base antivibration material 25A filling in the spaces 31 allows the resilient holding fingers 17 pressing against the outer surface of the pipe or the like to be deformed or bent toward the spaces 31 while flexibly following the movement of the pipe or the like. This action can also absorb vibrations. The resilient holding fingers 17 capable of being bent toward the spaces 31 can reduce a force necessary for inserting a pipe or the like into the object-holding portion 29 to facilitate the insertion operation.

Figure 9:
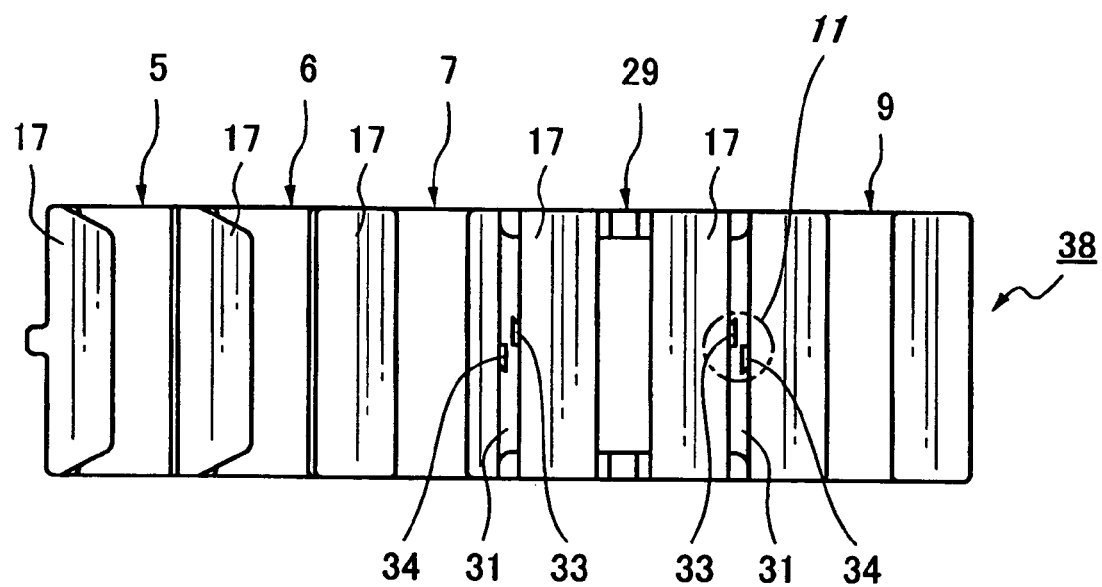
FIG. 9 is a top plan view of a clamp according to a second embodiment of the present invention under the condition before an antivibration material is coated thereon.
Figure 11:
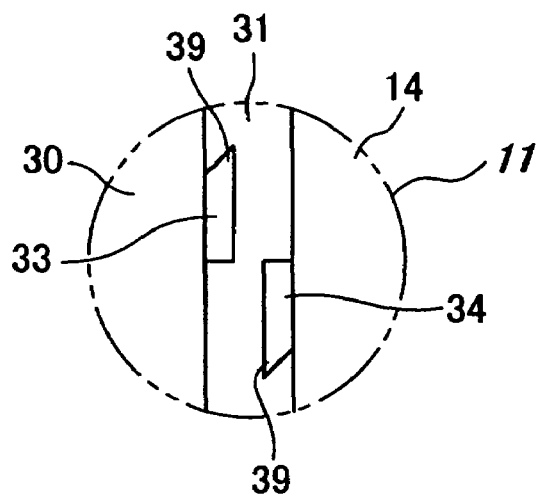
FIG. 11 is a view showing the detail of the circle 11 of the clamp in FIG. 9.

As illustrated in FIGS. 9 and 11, each of the outer surfaces of adjacent curved walls 30 and 14 opposed to one another across a space 31 is formed with a protrusion 33, 34. The protrusion 33 and the protrusion 34 are formed on the outer surface of the curved wall 30 and the outer surface of the curved wall 14, respectively. The protrusions 33 and 34 are formed at offset positions to prevent them from interfering with one another when the curved wall 30 is deformed or bent toward the space 31, or to prevent them from hindering the bending of the curved wall 30 or the bending of resilient holding finger 17 toward the spaces 31. The protrusions 33, 34 are intended to engage the antivibration material 25A introduced into the spaces 31 so as to allow the antivibration material 25A to be strongly joined with the curved wall 30 and the curved wall 14. The engagement between the antivibration material 25A and the protrusion 33 of the curved wall 30 and between the antivibration material 25A and the protrusion 34 of the curved wall 14 allows the antivibration material 25A to be strongly joined with the curved walls 30 and 14 so as to prevent peeling of the antivibration material 25A. The protrusions 33, 34 may be formed in any suitable shape allowing the antivibration material 25A to be strongly joined with the curved wall 30 and the curved wall 14. It is preferable to use a shape having a wedge-shaped edge 39, as shown in FIG. 11.

Figure 10:
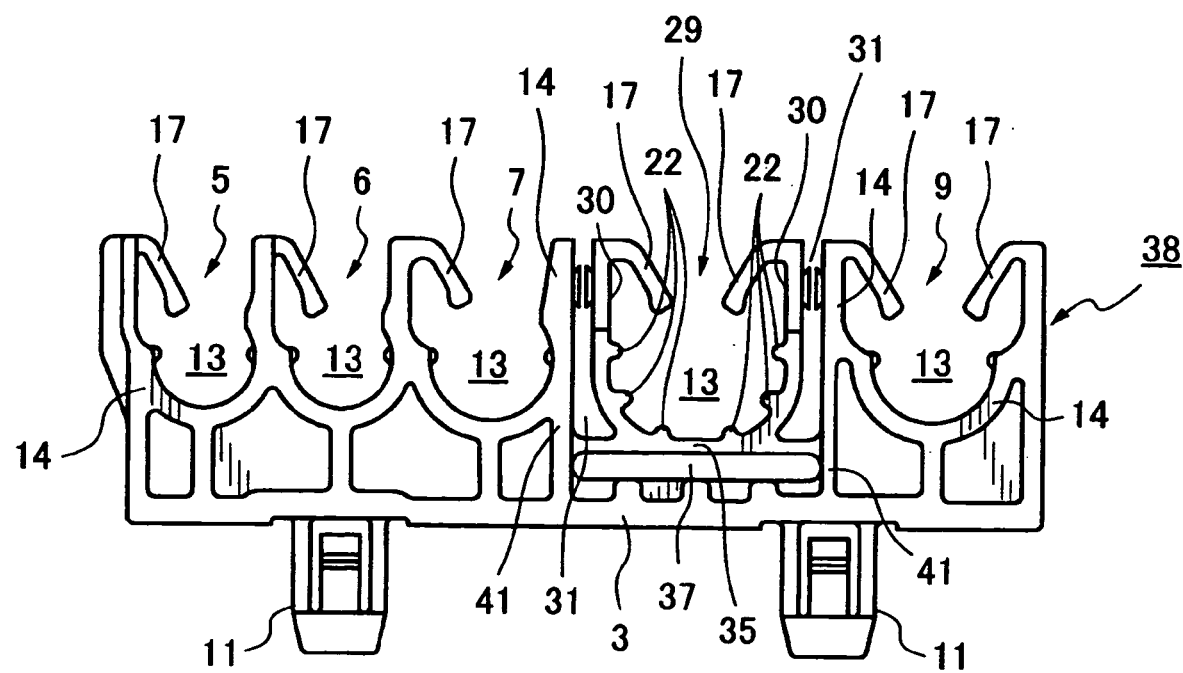
FIG. 10 is a front view of the clamp of FIG. 9.
Figure 12:
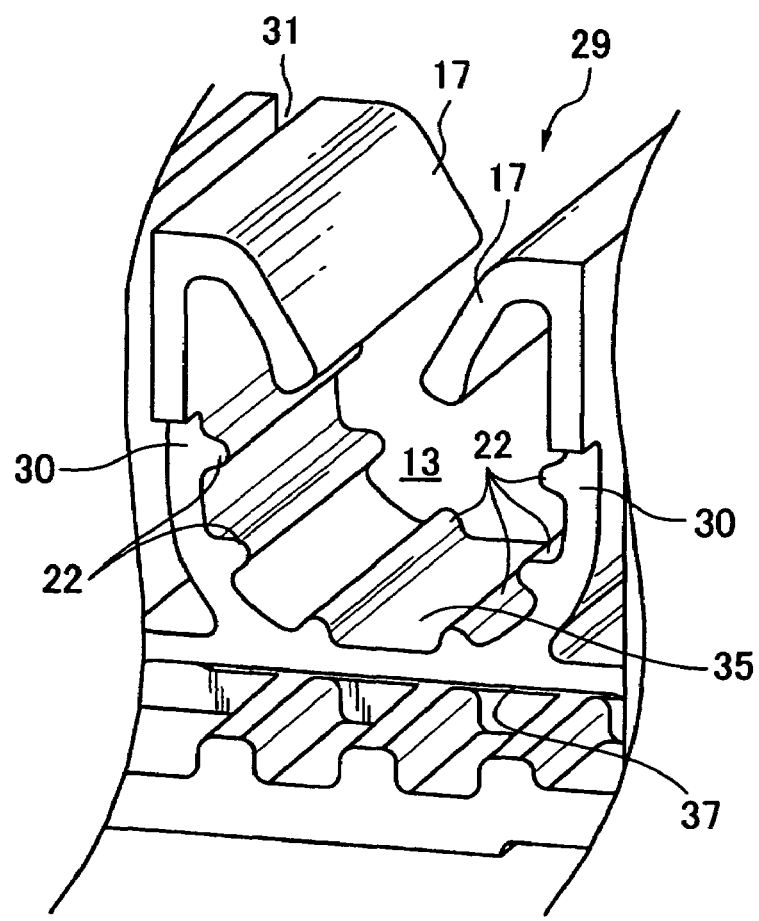
FIG. 12 is a perspective view of the object-holding portion 8 of the clamp in FIG. 9.

As shown in FIGS. 10 and 12, the through-hole 37 is formed between the base 3 and the bottom 35 of the curved wall 30 of the antivibration-material-coated object-holding portion 29 to extend in the width direction of the curved wall 30 (i.e., in the longitudinal direction of a pipe, for example). The antivibration material 25A fills the hole 37. The through-hole 37 allows the bottom 35 to be readily deformed so as to prevent vibration transmission. Further, the antivibration material 25A can absorb vibrations to provide enhanced antivibration effect. As shown in FIG. 10, the hole 37 is designed to be thin and to have a length greater than the spacing of the arms of the curved wall 30. The hole 37 is designed to isolate the curved wall 30 from the base 3. However, the curved wall 30 is integrally connected to support portions 41 which extend from the base 3 at adjacent object-holding portions 7, 9. Thus, the connection strength between the curved wall 30 and the base 3 is maintained at a high level. Due to the presence of the hole 37, the antivibration clamp 27 does not include the support portion 19 and holes 21 in the object-holding portion 8 of the antivibration clamp 2 according to the first embodiment.

While preferred embodiments of the invention have been shown and described, it will be apparent that modifications can be made without departing from the principles and spirit of the invention, the scope of which is defined in the appended claims.

What is claimed is:

1. An antivibration clamp for holding an elongated object, such as a pipe, comprising a base made of hard resin, and an object-holding portion made of hard resin and supported by the base,
    wherein the object-holding portion includes a curved wall connected integrally with the base to define a recess for receiving an elongated object therein, and a resilient holding finger extending obliquely from the top of the curved wall or its vicinity toward the recess of the curved wall to press against an outer surface of the elongated object when received in the curved wall, and
    wherein the curved wall has an inner wall surface formed with a plurality of elongated rigid ribs protruding inward and extending in the width direction of the curved wall, which is the longitudinal direction of the elongated object, while being spaced apart from each other in the circumferential direction of the curved wall, and both the inner wall surface and the ribs of the curved wall have a coating thereon of an antivibration material made of soft resin.

2. The antivibration clamp as defined in claim 1, wherein each of the ribs includes a top portion having a length equal to the width of the curved wall, and a root portion on the inner wall surface, each of opposite longitudinal ends of each rib being tapered in such a manner that the length of the root portion becomes shorter than the width of the curved wall.

3. The antivibration clamp as defined in claim 1, wherein all of the curved wall, the resilient holding finger, the ribs and the base are integrally formed as a primary molded product of hard resin, and the antivibration material is a coating on the curved wall and the ribs of the primary molded product.

4. The antivibration clamp as defined in claim 1, wherein the antivibration material is coating on opposite side surfaces of the curved wall and opposite ends of each of the ribs.

5. The antivibration clamp as defined in claim 1, wherein the base includes a fixing device to fix the clamp to a substrate, such as an automobile body.

6. An antivibration clamp for holding an elongated object, such as a pipe, comprising a base made of hard resin, and an object-holding portion made of hard resin and supported by the base,
    wherein the object-holding portion includes a curved wall connected integrally with the base to define a recess for receiving an elongated object therein, and a resilient holding finger extending obliquely from the top of the curved wall or its vicinity toward the recess of the curved wall to press against an outer surface of the elongated object when received in the curved wall, and
    wherein the curved wall has an inner wall surface formed with a plurality of elongated rigid ribs protruding inward and extending in the width direction of the curved wall, which is the longitudinal direction of the elongated object, while being spaced apart from each other in the circumferential direction of the curved wall, and both the inner wall surface and the ribs of the curved wall have a coating thereon of an antivibration material made of soft resin, wherein the base includes a plurality of object-holding portions integrally formed therewith, at least one of the object-holding portions being formed as an antivibration-material-coated object-holding portion coated with the antivibration material, a space is formed between each of the curved walls of the antivibration-material-coated object-holding portion and an object-holding portion adjacent to the antivibration-material-coated object-holding portion, to isolate the curved walls from one another, and the antivibration material fills the space.

7. The antivibration clamp as defined in claim 6, wherein adjacent curved walls have outer surfaces opposed to one another across the space, and at least one of the outer surfaces is formed with a protrusion in engagement with the antivibration material in the space.

8. The antivibration clamp as defined in claim 6, which includes a through-hole extending in the width direction of the curved wall between the base and the bottom of the curved wall of the antivibration-material-coated object-holding portion, wherein the antivibration material fills the thorough-hole.

9. An antivibration clamp comprising an object-holding portion that includes a curved wall defining a recess for receiving an object to be clamped, the curved wall having a plurality of elongated ribs protruding inwardly from the curved wall and spaced apart circumferentially of the curved wall, the inner surface of the curved wall and the ribs having a coating thereon of an antivibration material that is softer than a material of which the curved wall and the ribs are formed.

10. An antivibration clamp as defined in claim 9, wherein the antivibration material includes a coating on ends of the curved wall and ends of the ribs.

11. An antivibration clamp comprising an object-holding portion that includes a curved wall defining a recess for receiving an object to be clamped, the curved wall having a plurality of elongated ribs protruding inwardly from the curved wall and spaced apart circumferentially of the curved wall, the inner surface of the curved wall and the ribs having a coating thereon of an antivibration material that is softer than a material of which the curved wall and the ribs are formed, wherein the antivibration material includes a coating on ends of the curved wall and ends of the ribs, and wherein the curved wall is supported on a base in such a manner that spaces are formed between the curved wall and the base, the spaces being filled with antivibration material.

* * * * *